United States Patent
Schröder

(10) Patent No.: US 6,868,045 B1
(45) Date of Patent: Mar. 15, 2005

(54) VOICE CONTROL SYSTEM WITH A MICROPHONE ARRAY

(75) Inventor: Ernst F. Schröder, Hannover (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 337 days.

(21) Appl. No.: 09/660,381

(22) Filed: Sep. 12, 2000

(30) Foreign Application Priority Data

Sep. 14, 1999 (DE) .......................................... 199 47 875

(51) Int. Cl.$^7$ ............................................. G10K 11/00
(52) U.S. Cl. ........................ 367/198; 367/124; 367/197; 367/117; 340/5.84; 340/825.24; 340/825.25; 704/275
(58) Field of Search ................................. 704/275, 120, 704/238; 340/460, 5.84, 825.24, 825.25; 367/198, 197, 199

(56) References Cited

U.S. PATENT DOCUMENTS

| | | | | |
|---|---|---|---|---|
| 4,302,749 | A | 11/1981 | Ylonen ........................ | 367/198 |
| 4,311,874 | A | 1/1982 | Wallace, Jr. ............. | 179/1 CN |
| 4,357,488 | A | 11/1982 | Knighton et al. ......... | 179/1 SC |
| 5,086,385 | A * | 2/1992 | Launey et al. ............... | 364/188 |
| 5,218,641 | A * | 6/1993 | Abe et al. ...................... | 381/79 |
| 5,963,872 | A * | 10/1999 | Stein .......................... | 455/557 |
| 6,188,985 | B1 * | 2/2001 | Thrift et al. ................. | 704/275 |
| 6,223,160 | B1 * | 4/2001 | Kostka et al. .............. | 704/275 |
| 6,317,501 | B1 | 11/2001 | Matsuo ........................ | 381/92 |
| 6,349,352 | B1 * | 2/2002 | Lea ............................. | 710/72 |

FOREIGN PATENT DOCUMENTS

| | | | | |
|---|---|---|---|---|
| DE | 3742929 C1 | 9/1988 | ............. | G10L/7/08 |
| DE | 3929481 A1 | 3/1990 | ............. | G10L/3/00 |
| DE | 19741596 A1 | 3/1999 | ............. | H04R/1/20 |
| DE | 19812697 A1 | 9/1999 | ............. | G10L/7/08 |
| DE | 19827134 A1 | 11/1999 | ............. | G10L/7/08 |
| EP | 0867860 A2 | 9/1998 | | |
| EP | 0911808 A1 | 4/1999 | | |
| FR | 2744630 | 8/1997 | ............. | A61G/5/04 |

OTHER PUBLICATIONS

European Search Report citing the above–listed references: AM and AR, with a facsimile transmission date of Jul. 1, 2003.
German Search Report citing the above–listed references: AA, AB, AM, AN, AO, AP, AQ, and AR.

* cited by examiner

*Primary Examiner*—Michael Horabik
*Assistant Examiner*—Vernal Brown
(74) *Attorney, Agent, or Firm*—Joseph S. Tripoli; Robert D. Shedd; Kuniyuki Akiyama

(57) ABSTRACT

Voice control systems are used in diverse technical fields. In this case, the spoken words are detected by one or more microphones and then fed to a speech recognition system. In order to enable voice control even from a relatively great distance, the voice signal must be separated from interfering background signals. This can be effected by spatial separation using microphone arrays comprising two or more microphones. In this case, it is advantageous for the individual microphones of the microphone array to be distributed spatially over the greatest possible distance. In an individual consumer electronics appliance, however, the distances between the individual microphones are limited on account of the dimensions of the appliance. Therefore, the voice control system according to the invention comprises a microphone array having a plurality of microphones which are distributed between different appliances, in which case the signals generated by the microphones can be transmitted to the central speech recognition unit, advantageously via a bidirectional network based on an IEEE 1394 bus.

6 Claims, 1 Drawing Sheet

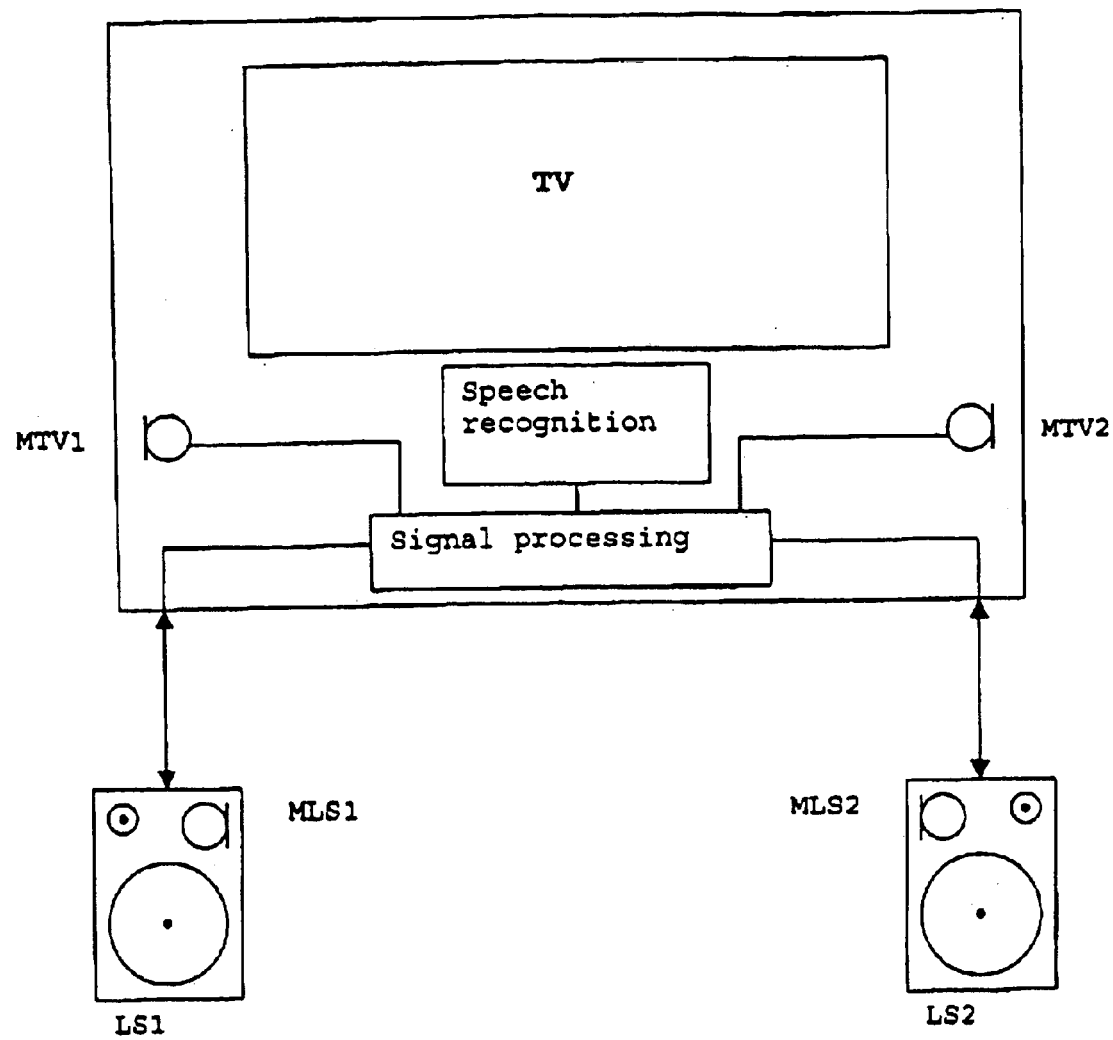

US 6,868,045 B1

VOICE CONTROL SYSTEM WITH A MICROPHONE ARRAY

FIELD OF THE INVENTION

The invention relates to a voice control system with a microphone array which can be utilized in particular for controlling apparatuses appertaining to consumer electronics.

BACKGROUND OF THE INVENTION

Voice control systems are used in a multiplicity of technical fields. In this case, the spoken words are firstly detected as sound signals, usually by one or more microphones, and are then fed to a speech recognition system. In this case, the speech recognition is usually based on an acoustic model and a speech model. The acoustic model utilizes a large number of speech patterns, mathematic algorithms being used to indicate the words which acoustically best match a spoken word. The speech model in turn is based on an analysis which uses a multiplicity of document samples to ascertain the context in which, and how often, certain words are normally used. Such speech recognition systems make it possible to recognize not only individual words but also fluently spoken sentences with high recognition rates. However, the recognition rate drops drastically when non-negligible background noises are present.

The robustness with respect to such acoustic interfering influences can be increased in various ways. Thus, in dictation systems for computers, a microphone on a headset frame is fastened directly in front of the speaker's mouth. In these systems, a very constant signal and hence an, in some instances, appreciable recognition rate can be achieved only by the direct proximity to the mouth. It is likewise known to control a television set by speaking the operational commands into the microphone which is integrated in a remote control. However, the remote control has to be held directly in front of the user'mouth in this case as well.

SUMMARY OF THE INVENTION

The invention is based on the object of specifying a voice control system which enables sufficient interference immunity even in the event of voice input from a relatively great distance. This object is achieved by means of the apparatus specified in claim 1.

In order to enable voice control even from a relatively great distance, the voice signal must be separated from interfering background signals. This can be effected by spatial separation using, microphone arrays comprising two or more microphones. In this case, it is advantageous for the individual microphones of the microphone array to be distributed spatially over the greatest possible distance. In an individual consumer electronics appliance, however, the distances between the individual microphones are limited on account of the dimensions of the appliance, such as e.g. to less than one meter in the case of a television set.

In principle, the voice control system according to the invention comprises a microphone array having a plurality of microphones for converting voice commands into electrical signals and a central speech recognition unit for converting these electrical signals into operational commands, the microphones being distributed between different appliances which are connected to ore another in such a way that the signals generated by the microphones can be transmitted to the central speech recognition unit.

In this case, the appliances are advantageously connected via a bidirectional network, which; is particularly advantageously based on an IEEE 1394 bus.

The system is particularly advantageous if one or more microphones are integrated in a consumer electronics reproduction appliance, in particular a television set, and one or more further microphones are integrated in external loudspeakers.

BRIEF DESCRIPTION OF THE DRAWINGS

An exemplary embodiment of the invention is described with reference to the drawing.

The drawing shows an arrangement according to the invention for voice control with a microphone array.

DETAILED DESCRIPTION OF PREFERRED EMBODIMENTS

FIG. 1 schematically illustrates a system according to the invention. Two external loudspeakers LS1, LS2, are connected to a television set TV. Internal loudspeakers (not illustrated in the figure) of the television set enable, together with the external loudspeakers, a surround sound reproduction of multi-channel audio signals, e.g. the reproduction of corresponding digital audio signals according to the MPEG 2 or. AC3 standard. In this case, the external loudspeakers are connected via an IEEE 1394 bus, also called FireWire, directly to the television set, but could equally be connected to a suitable surround sound receiver. The use of an IEEE 1394 bus is advantageous since the latter enables fast data transmission and communication between different appliances. Furthermore, in the case of active loudspeakers, power can be supplied via this bus at the same time.

For the detection of the voice signals, a microphone array is provided. The latter comprises two microphones MTV1 and MTV2—integrated an the television receiver—and a respective microphone MLS1 and MLS2 integrated in the loudspeaker housings. These microphones convert the detected sound signals into electrical signals which are amplified by amplifiers, converted into digital signals by AD converters and are then fed to a signal processing unit. In this case, the signals from the external loudspeakers are likewise fed via the IEEE 1394 bus to the signal processing unit in the television set. The said signal processing unit takes account of the respective whereabouts of the user by different scaling or processing of the detected sound signals. Furthermore, the microphone signals can also be corrected with regard to the sound signals output by the loudspeakers. The signal processed in this way is then fed to a speech recognition unit, which converts the electrical signals into words. Finally, the commands corresponding to these words are then fed to a system manager for controlling the system.

The scaling or processing of the detected sound signals by the signal processing unit requires the spatial arrangement of the microphones to be known. This is already known by the manufacturer for the microphones which are integrated in the TV housing. For microphones which are arranged in the loudspeakers, by contrast, the posit-on relative to the TV set must still be determined. This can be done by measurement and inputting of the values determined via a corresponding screen menu. However, a measurement and calibration operation may likewise be carried out by a test signal tone being reproduced by the loudspeakers and detected by the microphones and the position of the microphones being determined from the different propagation delays.

The two microphones integrated in the television receiver may advantageously be accommodated on the left-hand and right-hand sides of the housing of the respective appliance. However, this number of microphones and likewise the number of further microphones are in no way restricted to two. A multiplicity of combinations in which the microphones are integrated are likewise conceivable. Thus, instead of or, in addition to the television set, microphones may also be integrated in a video recorder, DVD player or a remote control. It is even possible to install microphones in appliances which are situated in different rooms.

Furthermore, the connection of the appliances is not restricted to a bus system. Thus, it is conceivable, for example, for the loudspeakers in the embodiment from FIG. 1 to be driven by radio signals instead. In this case, however, the individual loudspeakers must also have a radio transmitter in addition to a radio receiver.

The invention can be used for the voice-activated remote control of a wide variety of appliances appertaining to consumer electronics, such as e.g. of TV sets, video recorders, DVD players, satellite receivers, TV/video combinations, audio devices or complete audio systems, but likewise of personal computers or of domestic appliances.

What is claimed is:

1. Voice control system for a consumer electronics device with one or more external loudspeakers, using a microphone array, the voice control system comprising a plurality of microphones for converting a detected signal to electrical signals, wherein one or more microphones are integrated in said external loudspeakers;

a central signal processing unit being connected to the plurality of microphones, the signal processing unit scaling or processing the electrical signals received from the plurality of microphones according to the respective position of the microphones relative to the user, the respective position being given by different propagation delays; and a central speech recognition unit for converting the electrical signals from said signal processing unit into operational commands for the consumer electronics device.

2. System according to claim 1, wherein the one or more appliances are connected via a bi-directional network.

3. System according to claim 2, wherein the bi-directional network is based on an IEEE 1394 bus.

4. System according to claim 1, wherein the consumer electronics device is a television set or a video recorder.

5. System according to claim 1, wherein all microphones are connected to the same signal processing unit.

6. System according to claim 1, wherein the one or more external loudspeakers are connected via a radio network.

\* \* \* \* \*